UNITED STATES PATENT OFFICE.

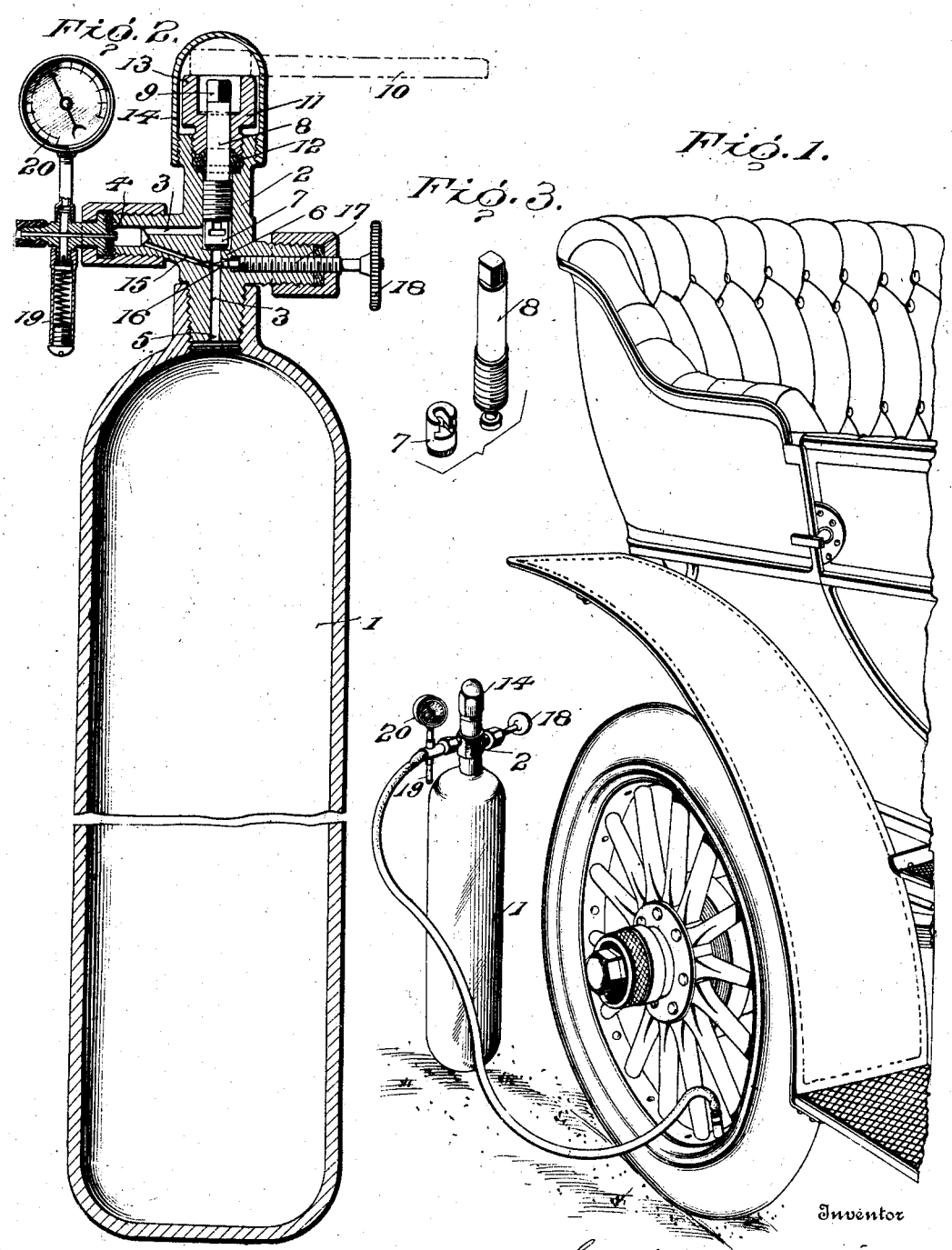

GABRIEL A. BOBRICK, OF LOS ANGELES, CALIFORNIA.

COMPRESSED-FLUID CHARGING AND DISCHARGING DEVICE.

No. 873,984.

Specification of Letters Patent.

Patented Dec. 17, 1907.

Application filed December 21, 1906. Serial No. 348,995.

*To all whom it may concern:*

Be it known that I, GABRIEL A. BOBRICK, of Los Angeles, California, have invented a new and useful Improvement in Compressed-Fluid Charging and Discharging Devices, which improvement is fully set forth in the following specification.

This invention relates to mechanism for controlling the charging of a fluid under pressure (whether in a liquid or gaseous form) into a reservoir, and discharging the same from the reservoir in the form of a gas at reduced pressure, and has for its object to provide a device of this character which shall be simple in construction, easy to operate, and inexpensive to manufacture.

With this object in view, the invention consists of a valve mechanism for use in connection with a suitable reservoir, which mechanism is provided with a valve casing for a large or open charging passage or conduit, a valve controlling said large passage or conduit, which valve is thrown open during the charging operation and closed when the charging is completed; and a restricted passage or discharge conduit in said valve casing, which restricted passage is provided with a valve capable of fine adjustment for permitting the escape of the gas in the act of discharging.

The large charging passage and the restricted discharging passage may, if desired, be constructed as entirely separate passages or conduits through the metal of the valve casing, but preferably, and as herein shown, the charging passage leads from an exterior port in the casing to an interior one delivering into the reservoir, and is controlled intermediate said ports by a suitable valve;
the restricted discharge passage in this instance is in the form of a by-pass leading around the valve controlling the charging passage, and such restricted discharge passage is controlled by a fine valve, preferably in the form of a very fine needle valve.

In some instances, as in inflating a tire of an automobile or like structure, it may be desirable to provide means whereby it shall be rendered impossible for the pressure in the inflated tire to exceed a predetermined point, and in such cases a safety valve is interposed between the discharge valve and the tire. By setting this safety valve so as to open or blow off at any predetermined pressure, it is rendered impossible for the pressure in the tire to exceed that at which the safety valve is set. Furthermore, as a means of indicating the pressure within the conduit leading to the tire at any moment, a suitable pressure gage may be attached to the conduit.

As herein shown, the invention is illustrated as being employed for inflating tires of automobiles or like structures, but such illustration of one use of the invention is not to be taken as limiting the invention to such use, since it is capable of a variety of uses.

The inventive idea involved is capable of embodiment in a variety of mechanical constructions, one of which, for the purpose of illustrating the invention, is shown in the accompanying drawings, in which—

Figure 1 is a perspective view of the device in position for inflating the tire of an automobile; Fig. 2 is a longitudinal central section of the device with parts shown in elevation; and Fig. 3 is a detail showing the construction of the valve for controlling the charging passage.

Referring to the drawings, 1 is a reservoir for the fluid under pressure, whether of liquid or gaseous form; 2 is a valve casing here shown in the form of a casting, with suitable conduits and valve seats formed therein, and 3 is a charging conduit leading inward from the exterior port 4 through the metal of the casing 2 and delivering into the reservoir 1 at the port 5. As here shown, this conduit makes an angular turn in the metal of the casing 2, and adjacent to the angle there is formed a valve seat 6 upon which is seated a valve 7 preferably swiveled on the lower end of a screw-threaded valve stem 8, provided with an angular head 9 on the exterior end thereof, by means of which a suitable wrench 10 may be applied for adjusting the valve. Preferably, the exterior end of the valve is surrounded and protected by a screw-threaded sleeve 11, which at its lower end compresses a suitable packing 12, while on its outer or exterior end it is provided with an annular flange 13 surrounding the exterior end 9 of the valve stem 8. By this construction a specially formed tool is rendered necessary for manipulating the valve stem, and as it is designed that this valve shall only be opened when in a charging station, the provision of such special construction whereby a peculiar wrench is necessary for its operation by those other than at the factory or charging station, is less liable to occur. As a further means of protecting the charging valve, the entire sleeve 11 in the end of the valve is inclosed in a cap 14 screw-threaded onto the end of the casing 2.

As here shown, the restricted discharge passage 15 is in the form of a by-pass leading from one branch of the charging passage 3 around the valve 7 to the enlarged portion of the other branch of the charging passage, where it joins the port 4. This restricted discharge passage 15 is controlled by the needle valve 16 carried on the end of the screw-threaded valve stem 17, which stem is provided with a milled operating wheel 18.

When it is desired to charge the reservoir 1 with compressed fluid, the charging apparatus is connected at the port 4 and the valve 7 is thrown open so as to afford a large open passage via the conduit 3 into the reservoir. The reservoir having been charged, the valve 7 is closed firmly on its seat and the cap 14 screwed over the exterior end of the valve. During this operation, the needle valve 16 may have been either opened or closed, but before the device is disconnected from the discharging apparatus, said valve 16 should also be closed. When it is desired to discharge the fluid from the reservoir in the form of a gas under reduced pressure, the device into which the gas is to be discharged is connected to the valve casing at the port 4, and the needle valve 16 is slightly opened, and as the fluid has to pass the restricted opening surrounding the point of the needle valve 16, it escapes into the restricted passage 15 at a much reduced pressure and passes via the port 4 into the conduit leading to the point where the discharged gas is to be delivered. In inflating tires of automobiles or like structures, it is desirable that the gas should not exceed a given pressure in the tire, and for this purpose there is attached to the delivery conduit at any suitable point, and preferably at the exit of the valve casing, a safety valve 19 of any suitable and approved construction. There may also be attached at this or any other suitable point a gage 20.

While any suitable form of valve may be employed for closing the charging passage 3, the form preferred is that illustrated in Fig. 3, in which the valve 7 is swiveled to the end of the stem 8 in such a way that the valve will not partake of the rotation of the valve stem, but will have only a longitudinal or rectilinear movement imparted thereto when the stem is screwed up or down. While this form of valve is preferred, it is not to be understood that the invention is limited to this particular form, since any suitable valve may be employed for this purpose.

What is claimed is:

1. A valve mechanism for controlling the charging of a fluid under pressure into and discharging the same from a reservoir, said mechanism consisting of a valve-casing having a single port for both charging the fluid and discharging it from the reservoir, with a large or free charging passage leading from said port into the reservoir, a valve controlling said charging passage, a restricted discharge passage between the said reservoir and port, and a valve controlling said discharge passage.

2. A valve mechanism for controlling the charging of a fluid under pressure into and discharging the same from a reservoir, said mechanism consisting of a valve-casing having a single port for both charging fluid into and discharging it from the reservoir, a large charging passage leading from said port to said reservoir, means closing said passage intermediate its ends, and discharging means permitting a restricted flow of gas from the reservoir to said port, whereby the compressed or liquefied gas may be readily charged into the reservoir and may be discharged therefrom at a reduced pressure.

3. A valve mechanism for controlling the charging of a fluid under pressure into and discharging the same from a reservoir, said mechanism consisting of a valve-casing having a single port for both charging fluid into and discharging it from the reservoir, a large charging passage leading from said port to said reservoir, means closing said passage intermediate its ends, a by-pass around said valve, and means permitting a restricted flow of gas through said by-pass, whereby the compressed or liquefied gas may be readily charged into the reservoir and may be discharged therefrom at a reduced pressure.

4. A valve mechanism for controlling the charging of a fluid under pressure into and discharging the same from a reservoir, said mechanism consisting of a valve casing having a port opening into the reservoir and another port opening exterior to the reservoir, with two passages of different capacity between said ports, and means controlling the flow of fluid through said passages, whereby fluid in liquid or highly compressed gaseous form may be readily charged into the reservoir, and may be discharged therefrom at a reduced pressure.

5. A valve mechanism for controlling the charging of a fluid under pressure into and discharging the same from a reservoir, said mechanism consisting of a valve casing having a port opening into the reservoir and another port opening exterior to the reservoir, with two passages of different capacity between said ports, means controlling the flow of fluid through said passages, whereby fluid in liquid or highly compressed gaseous form may be readily charged into the reservoir, and may be discharged therefrom at a reduced pressure, and a pressure-relief device communicating with said exterior port.

6. A valve mechanism for controlling the charging of a fluid under pressure into and discharging the same from a reservoir, said mechanism consisting of a valve casing having a port opening into the reservoir and another port opening exterior to the reservoir, with two passages of different capacity between said ports, means controlling the flow of fluid through said passages, whereby fluid in liquid or highly compressed gaseous form may be readily charged into the reservoir, and may be discharged therefrom at a reduced pressure, and a pressure-indicating device communicating with said exterior port.

In testimony whereof I have signed this specification in the presence of two subscribing witnesses.

GABRIEL A. BOBRICK.

Witnesses:
S. T. CAMERON,
W. B. KERKAM.